United States Patent
Berger et al.

(10) Patent No.: US 10,440,766 B2
(45) Date of Patent: Oct. 8, 2019

(54) PROVIDING COMMUNICATION SERVICES TO A PLURALITY OF USER EQUIPMENTS OF A TELECOMMUNICATIONS NETWORK

(71) Applicant: Deutsche Telekom AG, Bonn (DE)

(72) Inventors: Karl Berger, Vienna (AT); Gerad Kern, St. Andrae (AT)

(73) Assignee: DEUTSCHE TELEKOM AG, Bonn (DE)

( * ) Notice: Subject to any disclaimer, the term of this patent is extended or adjusted under 35 U.S.C. 154(b) by 42 days.

(21) Appl. No.: 15/572,792

(22) PCT Filed: Apr. 5, 2016

(86) PCT No.: PCT/EP2016/057456
§ 371 (c)(1),
(2) Date: Nov. 9, 2017

(87) PCT Pub. No.: WO2016/180578
PCT Pub. Date: Nov. 17, 2016

(65) Prior Publication Data
US 2018/0124861 A1   May 3, 2018

(30) Foreign Application Priority Data
May 12, 2015   (EP) .................................... 15167390

(51) Int. Cl.
*H04W 76/15*   (2018.01)
*H04L 12/917*   (2013.01)
(Continued)

(52) U.S. Cl.
CPC ......... *H04W 76/15* (2018.02); *H04L 47/2408* (2013.01); *H04L 47/76* (2013.01);
(Continued)

(58) Field of Classification Search
CPC .................................................... H04W 76/15
See application file for complete search history.

(56) References Cited

U.S. PATENT DOCUMENTS

2009/0323601 A1* 12/2009 Wu .................... H04W 28/065
370/329
2012/0120921 A1* 5/2012 Watanabe ............. H04W 72/00
370/331
(Continued)

FOREIGN PATENT DOCUMENTS

CN   103905378 A   7/2014
EP   2467971 A1   6/2012
(Continued)

OTHER PUBLICATIONS

ETSI: "Digital Cellular Telecommunications System (Phase 2+); Universival Mobile Telecommunications Systems (UMTS); LTE; Policy and charging control architecture (3GPP TS 23.203 version 10.8.0 Release 10)", Nov. 30, 2012 (Nov. 30, 2012), pp. 1-134, XP055201961.

*Primary Examiner* — Samina F Choudhry
(74) *Attorney, Agent, or Firm* — Leydig, Voit & Mayer, Ltd.

(57) ABSTRACT

A method for providing communication services to a plurality of user equipments of a telecommunications network includes: in a first step, both a first type of communication services and a second type of communication services require, respectively, a first communication bearer to be established between the telecommunications network and a respective user equipment of the plurality of user equipments; and in a second step, subsequent to the first step, at least a second communication bearer is established and/or activated by or for a first user equipment in case that the first user equipment detects network performance of the telecommunications network above a predefined first network (Continued)

performance threshold or receives information indicating network performance above the predefined first network performance threshold.

12 Claims, 2 Drawing Sheets

(51) Int. Cl.
*H04L 12/911* (2013.01)
*H04L 12/927* (2013.01)
*H04L 12/851* (2013.01)
*H04W 28/02* (2009.01)

(52) U.S. Cl.
CPC .......... *H04L 47/808* (2013.01); *H04L 47/822* (2013.01); *H04W 28/0257* (2013.01)

(56) References Cited

U.S. PATENT DOCUMENTS

2012/0210003 A1 8/2012 Castro et al.
2014/0126406 A1* 5/2014 Ibanez ................ H04L 41/5025
                                            370/252
2015/0296559 A1 10/2015 Liu et al.

FOREIGN PATENT DOCUMENTS

EP          2940955 A1    11/2015
WO      2013007287 A1     1/2013

* cited by examiner

PROVIDING COMMUNICATION SERVICES TO A PLURALITY OF USER EQUIPMENTS OF A TELECOMMUNICATIONS NETWORK

CROSS-REFERENCE TO RELATED APPLICATIONS

This application is a U.S. National Phase application under 35 U.S.C. § 371 of International Application No. PCT/EP2016/057456, filed on Apr. 5, 2016, and claims benefit to European Patent Application No. EP 15167390.2, filed on May 12, 2015. The International Application was published in English on Nov. 17, 2016 as WO 2016/180578 A1 under PCT Article 21(2).

FIELD

The present invention relates a method for providing communication services to a plurality of user equipments of a telecommunications network, wherein the telecommunications network provides a first type of data transmission service to at least a first user equipment and provides a second type of data transmission service with a predefined second maximum data transmission speed to at least a second user equipment, wherein the second type of data transmission service with the predefined second maximum data transmission speed involves either the predefined second maximum data transmission speed or a predefined payload data transfer volume per a predetermined time interval which predefined payload data transfer volume is available to be used by the respective user equipment at a data transmission speed up to the predefined second maximum data transmission speed compared to a first maximum data transmission speed to be applied once the predefined payload data transfer volume is used prior to the end of the time interval.

Furthermore, the present invention relates to a system and a telecommunications network for providing communication services to a plurality of user equipments of the telecommunications network, wherein the telecommunications network provides a first type of data transmission service to at least a first user equipment and provides a second type of data transmission service with a predefined second maximum data transmission speed to at least a second user equipment, wherein the second type of data transmission service with the predefined second maximum data transmission speed involves either the predefined second maximum data transmission speed or a predefined payload data transfer volume per a predetermined time interval which predefined payload data transfer volume is available to be used by the respective user equipment at a data transmission speed up to the predefined second maximum data transmission speed compared to a first maximum data transmission speed to be applied once the predefined payload data transfer volume is used prior to the end of the time interval.

Furthermore, the present invention relates to a program and to a computer program product for providing communication services to a plurality of user equipments of a telecommunications network according to exemplary embodiments of the inventive method, system and telecommunications network.

BACKGROUND

In current telecommunications networks, bandwidth is typically a limited resource. As communication access needs as well as the number of mobile terminals continually increase, the demand for both wireline and wireless communication capacity steadily increases.

As a consequence, it becomes increasingly important to allocate the available bandwidth in any communication system—especially a mobile communication network or a fixed-line (wireline) telecommunications network—in the best possible way, in order to use the available bandwidth as efficiently as possible.

Typically, the maximum available bandwidth is limited for all subscribers of a telecommunications network, at least those that are part of a common subscriber segment. This means that even in case that the telecommunications network would be able to provide a higher bandwidth (due to spare capacity of the telecommunications network, e.g. a core network and an access network of the telecommunications network) to at least part of the user equipments connected to the telecommunications network, such an increased transmission bandwidth (or payload data transfer volume) is not provided to the user equipment but, instead, a standard (or default) available bandwidth is provided to the user equipments, at least those user equipments that are part of a given subscriber segment.

As a consequence, network resources of the considered telecommunications network (that would be available to be used) are not used in order to provide an enhanced level of data transmission service.

SUMMARY

In an exemplary embodiment, the present invention provides a method for providing communication services to a plurality of user equipments of a telecommunications network. The telecommunications network provides a first type of data transmission service to at least a first user equipment of the plurality of user equipments, and the telecommunications network provides a second type of data transmission service with a predefined second maximum data transmission speed to at least a second user equipment of the plurality of user equipments. The second type of data transmission service with the predefined second maximum data transmission speed involves either the predefined second maximum data transmission speed or a predefined payload data transfer volume per a predetermined time interval which the predefined payload data transfer volume is available to be used by a respective user equipment at a higher data transmission speed up to the predefined second maximum data transmission speed compared to a first maximum data transmission speed to be applied once the predefined payload data transfer volume is used prior to the end of the time interval. The first type of communication services involves providing a potentially unlimited payload volume of data transfer to be used by the respective user equipment during the predetermined time interval such that the potentially unlimited payload volume of data transfer is potentially available to be used by the respective user equipment at a data transmission speed of up to at least the predefined second maximum data transmission speed. Any data transmission of payload data between the telecommunications network and any of the plurality of user equipments requires at least one communication bearer being established involving the respective user equipment. The method includes the following steps: in a first step, both the first type of communication services and the second type of communication services require, respectively, a first communication bearer to be established between the telecommunications network and the respective user equipment of the plurality of user equipments; and in a second step, subsequent to the first step, at least a second communication bearer is established and/or activated by or for the first user equipment in case that the first user equipment detects network performance of the telecommunications network above a predefined first network performance threshold or receives information indicating network performance above the predefined first network performance threshold.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide communication services to a plurality of user equipments of a telecommunications network such that the network resources of the telecommunications network are used to provide—within the limits of the resources of the telecommunications network as well as dependent on the current level of demand of network resources by all user equipments—as much data transmission service to the different user equipments (and also according to their demand or requirements) as possible.

In an exemplary embodiment, the present invention provides a method for providing communication services to a plurality of user equipments of a telecommunications network, wherein the telecommunications network provides a first type of data transmission service to at least a first user equipment of the plurality of user equipments and wherein the telecommunications network provides a second type of data transmission service with a predefined second maximum data transmission speed to at least a second user equipment of the plurality of user equipments, wherein the second type of data transmission service with the predefined second maximum data transmission speed involves either the predefined second maximum data transmission speed or a predefined payload data transfer volume per a predetermined time interval which the predefined payload data transfer volume is available to be used by the respective user equipment at a data transmission speed up to the predefined second maximum data transmission speed compared to a first maximum data transmission speed to be applied once the predefined payload data transfer volume is used prior to the end of the time interval, wherein the first type of data transmission service involves providing a potentially unlimited payload volume of data transfer to be used by the respective user equipment during the predetermined time interval such that the unlimited payload volume of data transfer is potentially available to be used by the respective user equipment at a data transmission speed of up to at least the predefined second maximum data transmission speed, wherein any data transmission of payload data between the telecommunications network and any of the plurality of user equipments requires at least one communication bearer being established involving the respective user equipment, wherein the method comprises the following steps:

in a first step, both the first type of data transmission service and the second type of data transmission service require, respectively, a first communication bearer to be established between the telecommunications network and the respective user equipment of the plurality of user equipments, in a second step, subsequent to the first step, at least a second communication bearer is established and/or activated by or for the first user equipment in case that the first user equipment detects a network performance of the telecommunications network above a predefined first network performance threshold or receives an information indicating such a network performance above the predefined first network performance threshold.

It is thereby advantageously possible according to the present invention that unused network capacities of the telecommunications network—especially in a situation outside peak hours—can be used in order to provide a superior quality of service level (i.e. the first type of data transmission service) to at least part of the users or subscribers that are using data transmission services of the telecommunications network during such a period of time (i.e. during off-peak hours). According to the present invention, it should be assured that such users or subscribers (using the first type of data transmission service) are not unfairly privileged compared to other users or subscribers that are not using this functionality (i.e. using only the second type of data transmission service).

According to the present invention, a plurality of users or subscribers, each having at least one user equipment, are using the services of the telecommunications network. It is to be assured that all of these users or subscribers are provided at least a standard service level of the telecommunications network. A subset of these users or subscribers of the telecommunications network (or at least one of these users or subscribers)—hereinafter also called the first user equipment—uses premium services, i.e., is potentially able to enjoy an enhanced service level, especially with respect to the maximum data transmission speed available to that user or subscriber (or to that subset of users or subscribers). The premium services is hereinafter also referred to by the wording "first type of data transmission service", whereas the standard service (or other service) is hereinafter also referred to by the wording "second type of data transmission service" provided towards, inter alia, the second user equipment. It is to be understood that—besides the first type of data transmission service and the second type of data transmission service—a further (third) type of data transmission service (e.g. of a further "standard service" providing, e.g., a reduced service level (especially, a reduced maximum data transmission speed) compared to the second type of data transmission service) might be possible within the telecommunications network; however, the following description mainly focusses on distinguishing the first and second type of data transmission service.

In short, the telecommunications network provides the first type of data transmission service ("premium service") to at least the first user equipment (or the above mentioned subset of the plurality of user equipments connected to the telecommunications network) and the second type of data transmission service ("standard service") to at least a second user equipment. The second type of data transmission service implies a predefined second maximum data transmission speed available to the second user equipment, i.e., to all the user equipments that do not receive the premium service of the first type of data transmission service.

According to the present invention, the second type of data transmission service (with the predefined second maximum data transmission speed) involves:

either the predefined second maximum data transmission speed (to be applied when using the second type of data transmission service), or a predefined payload data transfer volume per a predetermined time interval which the predefined payload data transfer volume is available to be used by the respective user equipment (i.e. the second user equipment or the group of user equipments receiving standard service) at a higher data transmission speed up to the predefined second maximum data transmission speed compared to a first maximum data transmission speed to be applied once the predefined payload data transfer volume is used prior to the end of the time interval. This simply means that the maximum data transmission speed to be applied (by the telecommunications network) for the second user equipment is—generally—limited to the second maximum data transmission speed, and, it is possible that, additionally, (i.e. in case that a maximum data transmission volume (hereinafter also called predefined payload data transfer volume) is reached within a given time interval of, e.g., a month or the like) the maximum data transmission speed is further reduced (to the first maximum data transmission speed) once the maximum data transmission volume is used (and the time interval is not yet terminated).

In contrast (to the second type of data transmission service), the first type of data transmission service involves providing a potentially unlimited payload volume of data transfer to be used by the respective user equipment during the predetermined time interval such that the unlimited payload volume of data transfer is potentially available to be used by the respective user equipment at a data transmission speed of up to at least the predefined second maximum data transmission speed. This means that the first type of data transmission service is not limited to the speed limit of the second maximum transmission speed.

According to an exemplary embodiment of the present invention, any data transmission of payload data between the telecommunications network and any of the plurality of user equipments requires at least one communication bearer being established involving the respective user equipment. An exemplary embodiment of the inventive method comprises the following steps:

in a first step, both the first type of data transmission service and the second type of data transmission service require, respectively, a first communication bearer to be established between the telecommunications network and the respective user equipment of the plurality of user equipments (i.e., the standard service is available to all the user equipments connected to the telecommunications network; both the first and the second user equipment), in a second step, subsequent to the first step, at least a second communication bearer is established and/or activated by or for the first user equipment in case that the first user equipment detects a network performance of the telecommunications network above a predefined first network performance threshold or receives an information indicating such a network performance above the predefined first network performance threshold. This means that the second communication bearer is established and/or activated by or for the first user equipment (in case the network conditions are sufficiently good) in addition to the first communication bearer (established anyway and to each of the user equipments connected to the telecommunications network). It is to be understood that according to the present invention, the second communication bearer (or generally any further communication bearer) is established and/or activated by the first user equipment only in case that there is a corresponding need (of the first user equipment) to be provided with a higher data transmission speed. This need can either be detected, by the first user equipment, in a situation of an actual data transfer event (initiated by the user of the first user equipment), or it can be deduced from a usage pattern of the user of the first user equipment (i.e., an enhanced bandwidth being typically needed at specific hours of the day), or the user equipment can be configured such that a need of a higher data transmission speed is always assumed for a specific user equipment concerned.

In the context of the present invention, the term "communication bearer" is meant to designate a data transmission capacity. In case that the telecommunications network is a mobile communication network, e.g., a mobile communication network according to the LTE access technology (Long Term Evolution, or fourth generation mobile communication network) the communication bearer may be an enhanced packet system (EPS) bearer or communication bearer. A communication bearer, like an enhanced packet system bearer according to the LTE mobile access technology, corresponds to a sort of channel (or tunnel) established to provide for the possibility of data transmission between the telecommunications network and the user equipment. However, the meaning of the term "communication bearer" in the context of the present invention is not limited to an LTE enhanced packet system bearer. In case that another mobile access technology—such as, e.g., UMTS (Universal Mobile Telecommunication System of a third generation mobile communication network) or GPRS (General Packet Radio System), or even a fifth generation mobile communication network—is used, the first and second communication bearers according to the present invention correspond to respective connections or data links according to the considered mobile access technology. Furthermore, the invention is not limited to the use of mobile communication networks only, but also refers to fixed-line (wireline or land-line) telecommunications networks: In this case, the telecommunications network correspond, e.g., to a fixed-line telecommunications network providing DSL (Digital Subscriber Line) communication services, and the communication bearer corresponds, e.g., to different bandwidths available to the respective user equipment. In case that the telecommunications network is a mobile communication network and is able to function according to the LTE standard, at least one EPS bearer (i.e. a communication bearer according to the present invention) is created (or generated) for any user equipment that attaches to the telecommunications network (or, in this case, mobile communication network). Such an EPS bearer connects the corresponding user equipment to a packet gateway (P-GW), wherein the packet gateway is part of the core network of the telecommunications network (or mobile communication network) and wherein the EPS bearer is established (or created) between the user equipment and the packet gateway via the respective eNodeB node of the user equipment (i.e. the base station entity serving the radio cell the user equipment is connected to) and the serving gateway (S-GW) of the telecommunications network (or mobile communication network). The EPS bearer is created as a combination of one logical channel and at least one GTP tunnel (GPRS tunneling protocol), typically two GTP tunnels. In case of using an LTE mobile communication network, the first communication bearer preferably corresponds to the default EPS bearer (that is established in any case upon attaching the user equipment to the mobile communication network), and the second communication bearer (in case of the first user equipment detecting sufficient spare network resources of the telecommunications network) corresponds to a dedicated EPS bearer.

According to the present invention, it is preferred that a first quality-of-service level corresponds to the first communication bearer and a second quality-of-service level corresponds to the second communication bearer, wherein the second quality-of-service level corresponds to a quality-of-service of—the second communication bearer taken individually—inferior to the first quality-of-service.

Thereby, it is advantageously possible to assure that by potentially providing an increased data transmission speed ("premium service") according to the first type of data transmission service to the first user equipment (in case that the telecommunications network has sufficient spare capacity), it is prevented that the second user equipment is not even provided with at least the standard data transmission speed, i.e., the second maximum data transmission speed: Due to the higher or better quality-of-service level of the first communication bearer (compared to the second communication bearer), it is always assured that—in case that the network load of the telecommunications network increases in such a way that the additional data transmission speed for providing the second communication bearer cannot achieved (to the first user equipment)—the reduction of the data transmission speed is first applied to the second communication bearer (or the multitude of second communication bearers in case that a multitude of user equipments receive the first type of data transmission service), and not to the first communication bearer, or, more likely, the multitude of first communication bearers as the assumption is that a multitude or a plurality of user equipments (i.e. both the first and the second user equipments) receive the first type of data transmission service.

According to a further embodiment of the present invention, in a third step, subsequent to the second step, at least a third communication bearer is established and/or activated by the first user equipment in case that the first user equipment
    detects a network performance of the telecommunications network above a predefined further first network performance threshold, or
    receives an information indicating such a network performance of the telecommunications network above the predefined further first network performance threshold.

Thereby, it is advantageously possible that—in addition to the first communication bearer and the second communication bearer—the data transmission speed provided to the first user equipment can even further be enhanced, namely by using the third communication bearer. Typically, such a third communication bearer is invoked in case that sufficient spare network capacity of the telecommunications network is detected by the first user equipment. Of course, according to the present invention, it is also possible and preferred that in addition to the second and third communication bearers (e.g. provided to the first user equipment), additional communication bearers (i.e. a fourth communication bearer and/or a fifth communication bearer, etc.) are potentially established in relation to such user equipments that receive the first type of data transmission service.

According to a further embodiment of the present invention, it is also preferred that the predefined further first network performance threshold either corresponds to the predefined first network performance threshold or exceeds the predefined first network performance threshold.

Thereby, it is advantageously possible according to the present invention, that any subsequent communication bearer is only activated in case that a corresponding first network performance threshold applies, i.e., according to a first alternative of the present invention, the second communication bearer is invoked only in case that the network performance of the telecommunications network corresponds at least to the predefined first network performance threshold, and the third communication bearer is invoked only in case that the network performance of the telecommunications network corresponds at least to the predefined further first network performance threshold (exceeding the predefined first network performance threshold). According to a second alternative of the present invention, the second and third communication bearer are (both) invoked in case that the network performance of the telecommunications network corresponds at least to the predefined first network performance threshold (i.e. the predefined further first network performance threshold corresponds to the predefined first network performance threshold).

According to a further embodiment of the present invention, in a third step, subsequent to the second step, at least a third communication bearer is established and/or activated by the first user equipment in case that the first user equipment
    detects a network performance of the telecommunications network above a predefined further first network performance threshold, or
    receives an information indicating such a network performance of the telecommunications network above the predefined further first network performance threshold,
wherein the predefined further first network performance threshold either corresponds to the predefined first network performance threshold or exceeds the predefined first network performance threshold.

According to the present invention it is furthermore preferred that a third quality-of-service level corresponds to the third communication bearer, wherein the third quality-of-service level corresponds to a quality-of-service—of the third communication bearer taken individually—inferior to the second quality-of-service.

Thereby, it is advantageously possible to assure that by potentially providing an increased data transmission speed ("premium service") according to the first type of data transmission service to the first user equipment (in case that the telecommunications network has sufficient spare capacity), it is prevented that that the second user equipment is not even provided with at least the standard data transmission speed, i.e., the second maximum data transmission speed: Due to the higher or better quality-of-service level of the first communication bearer (compared to the second communication bearer) and the higher or better quality-of-service level of the second communication bearer (compared to the third communication bearer), it is always assured that—in case that the network load of the telecommunications network increases in such a way that the additional data transmission speed for providing the second and/or third communication bearer cannot achieved (to the first user equipment)—the reduction of the data transmission speed is first applied to the second and/or third communication bearer, and not to the first communication bearer, or, more likely, the multitude of first communication bearers.

According to a further embodiment of the present invention, in a third step, subsequent to the second step, at least a third communication bearer is established and/or activated by the first user equipment in case that the first user equipment
  detects a network performance of the telecommunications network above a predefined further first network performance threshold, or
  receives an information indicating such a network performance of the telecommunications network above the predefined further first network performance threshold
wherein a third quality-of-service level corresponds to the third communication bearer,
wherein the third quality-of-service level corresponds to a quality-of-service—of the third communication bearer taken individually—inferior to the second quality-of-service.

According to a further embodiment of the present invention, in a third step, subsequent to the second step, at least a third communication bearer is established and/or activated by the first user equipment in case that the first user equipment
  detects a network performance of the telecommunications network above a predefined further first network performance threshold, or
  receives an information indicating such a network performance of the telecommunications network above the predefined further first network performance threshold
wherein the predefined further first network performance threshold either corresponds to the predefined first network performance threshold or exceeds the predefined first network performance threshold
wherein a third quality-of-service level corresponds to the third communication bearer,
wherein the third quality-of-service level corresponds to a quality-of-service—of the third communication bearer taken individually—inferior to the second quality-of-service.

According to the present invention it is furthermore preferred that the network performance of the telecommunications network above the predefined first network performance threshold and/or above the predefined further first network performance threshold is detected or indicated by an information in case that one or a plurality out of the following situations apply:
  the time of the day corresponds to a specific time interval during a day,
  the packet latency of data packets is detected to be below a predetermined latency threshold as first network performance threshold or below a further predetermined latency threshold as further first network performance threshold and/or the roundtrip time of data packets is detected to be below a predetermined roundtrip time threshold as first network performance threshold or below a further predetermined roundtrip time threshold as further first network performance threshold,
  the packet loss rate of data packets is detected to be below a predetermined packet loss rate threshold as first network performance threshold or below a predetermined further packet loss rate threshold as further first network performance threshold,
  the maximum throughput is detected to be above a predetermined throughput threshold as first network performance threshold or above a further predetermined throughput threshold as further first network performance threshold.

It is thereby advantageously possible according to the present invention that the first user equipment is able to detect the network load of the telecommunications network. Typically, the network load of the telecommunications network is detected via detecting quality indicators such as packet latency, packet loss rate that are available to the user equipment, i.e. these indicators can be detected by the user equipment. As, according to the present invention, the first quality-of-service level (of the first communication bearer) is typically superior to the second quality-of-service (of the second communication bearer) (and likewise the second quality-of-service level (of the second communication bearer) is typically superior to the third quality-of-service (of the third communication bearer), i.e. generally the quality-of-service level is reduced with each additional communication bearer), it can be expected that, with increasing network load, the indicators of the network load will deteriorate in the first place for the last (or highest) communication bearer (i.e. in the example for the third communication bearer in case that there are a first, second and third communication bearer or for the second communication bearer in case that there are a first and a second communication bearer). Additionally according to the present invention, an additional communication bearer (i.e. a second or third communication bearer, additional to the first communication bearer) might be generally refused during a certain time (of the day or of the week or on special occasions such due to expected high network load of the telecommunications network).

According to a further preferred embodiment of the present invention, the first communication bearer and/or the second communication bearer and/or the third communication bearer are established and/or activated between the respective user equipment of the plurality of user equipments on the one hand, and a gateway entity of the telecommunications network.

According to still a further preferred embodiment of the present invention, the second communication bearer and/or the third communication bearer are continuously established for the first user equipment but only activated in case that corresponding network conditions of the telecommunications network apply.

Thereby, it is advantageously possible reduce the overhead requirements for establishing (and/or removing) the second and/or third (and perhaps even additional) communication bearers, as this provides the possibility to maintain the respective additional communication bearer (i.e. additional to the standard or default communication bearer corresponding to the first communication bearer) even during times of comparably high network load of the telecommunications network (i.e. such that these additional communication bearer are not used to transport data towards or from the respective user equipment. However, it needs to be assured that such an existing additional communication bearer (second and/or third and/or further communication bearers)—that is generated but not activated—does not add to the network load of the telecommunications network during times of already comparably high network load.

According to the present invention it is furthermore preferred that at least one of the following alternatives apply:

the first communication bearer and the second communication bearer are aggregated, the second communication bearer and the third communication bearer are aggregated, the first communication bearer, the second communication bearer and the third communication bearer are aggregated.

It is thereby advantageously possible to aggregate a part or all of the communication bearers established (and being activated) of the first user equipment which leads to a higher degree of flexibility in providing the first type of data transmission service to the first user equipment.

According to the present invention it is furthermore preferred that in a fourth step, subsequent to the second step, the second communication bearer is removed and/or de-activated by or for the first user equipment in case that the first user equipment detects a network performance of the telecommunications network below a predefined second network performance threshold or receives an information indicating such a network performance below the predefined second network performance threshold, and/or in a fifth step, subsequent to the third step, the third communication bearer is removed and/or de-activated by or for the first user equipment in case that the first user equipment detects a network performance of the telecommunications network below a predefined further second network performance threshold or receives an information indicating such a network performance below the predefined further second network performance threshold.

Thereby, it is advantageously possible to remove and/or de-activate additional communication bearers for the first user equipment (i.e. to remove and/or to de-activate the third and perhaps also the second communication bearer in case that the first, second, and third communication bearer is generated and/or activated with the first user equipment, and to remove and/or to de-activate the second communication bearer in case that the first and second communication bearer is generated and/or activated with the first user equipment) in case that the network load is such that these additional communication bearers cannot be supported by the telecommunications network. Typically, the second network performance threshold corresponds to the first network performance threshold in such a manner that a continuous switching or generation (of the second communication bearer on and off) is avoided, i.e. the first network performance threshold typically refers to a lower network load (or higher available network capacity) than the second network performance threshold. Likewise, the further second network performance threshold corresponds to the further first network performance threshold in such a manner that a continuous switching or generation (of the third communication bearer on and off) is avoided, i.e., the further first network performance threshold typically refers to a lower network load (or higher available network capacity) than the further second network performance threshold.

It is furthermore preferred that the first user equipment detects whether a limitation of the network performance (e.g. a limited bandwidth experience from the perspective of the first user equipment) is due to a reason within the telecommunications network or due to a reason outside of the telecommunications network, such as a server providing content, e.g., video content. In case such a detection (of a limited bandwidth experience) provides the result that the source of the bandwidth limitation is external to the telecommunications network, the request of an additional (i.e. second and/or third) communication bearer (additional to the first communication bearer) would be ineffective in providing the requested (or searched for) additional bandwidth. Hence, according to such an alternative realization of the present invention, the first user equipment refrains from invoking (or requesting) the second and/or third communication bearer. This detection (whether a limitation of the network performance is due to a reason within the telecommunications network or due to a reason outside of the telecommunications network) is preferably realized via (probe) messages and/or (probe) data packets being sent (by the first user equipment) to (edge) network nodes of the telecommunications network in order to verify the network performance of the telecommunications network (i.e. without the parts (especially external servers) outside of the telecommunications network).

Furthermore, an exemplary embodiment of the present invention provides a system for providing communication services to a plurality of user equipments of a telecommunications network, the system comprising the telecommunications network and at least a first user equipment, wherein the telecommunications network provides a first type of data transmission service to at least the first user equipment of the plurality of user equipments and wherein the telecommunications network provides a second type of data transmission service with a predefined second maximum data transmission speed to at least a second user equipment of the plurality of user equipments, wherein the second type of data transmission service with the predefined second maximum data transmission speed involves either the predefined second maximum data transmission speed or a predefined payload data transfer volume per a predetermined time interval which the predefined payload data transfer volume is available to be used by the respective user equipment at a higher data transmission speed up to the predefined second maximum data transmission speed compared to a first maximum data transmission speed to be applied once the predefined payload data transfer volume is used prior to the end of the time interval, wherein the first type of data transmission service involves providing a potentially unlimited payload volume of data transfer to be used by the respective user equipment during the predetermined time interval such that the unlimited payload volume of data transfer is potentially available to be used by the respective user equipment at a data transmission speed of up to at least the predefined second maximum data transmission speed, wherein any data transmission of payload data between the telecommunications network and any of the plurality of user equipments method requires at least one communication bearer being established involving the respective user equipment, wherein the system is configured such that:

both the first type of data transmission service and the second type of data transmission service require, respectively, a first communication bearer to be established between the telecommunications network and the respective user equipment of the plurality of user equipments, at least a second communication bearer is established and/or activated by or for the first user equipment in case that the first user equipment detects a network performance of the telecommunications network above a predefined first network performance threshold or receives an information indicating such a network performance above the predefined first network performance threshold.

Thereby, it is advantageously possible to provide a system that provides the advantages of exemplary embodiments of the inventive method.

Furthermore, an exemplary embodiment of the present invention provides a telecommunications network for providing communication services to a plurality of user equipments, wherein the telecommunications network provides a first type of data transmission service to at least a first user equipment of the plurality of user equipments and wherein the telecommunications network provides a second type of data transmission service with a predefined second maximum data transmission speed to at least a second user equipment of the plurality of user equipments, wherein the second type of data transmission service with a predefined second maximum data transmission speed involves either the predefined second maximum data transmission speed or a predefined payload data transfer volume per a predetermined time interval which the predefined payload data transfer volume is available to be used by the respective user equipment at a data transmission speed up to the predefined second maximum data transmission speed compared to a first maximum data transmission speed to be applied once the predefined payload data transfer volume is used prior to the end of the time interval, wherein the first type of data transmission service involves providing a potentially unlimited payload volume of data transfer to be used by the respective user equipment during the predetermined time interval such that the unlimited payload volume of data transfer is potentially available to be used by the respective user equipment at a higher data transmission speed of up to at least the predefined second maximum data transmission speed, wherein any data transmission of payload data between the telecommunications network and any of the plurality of user equipments method requires at least one communication bearer being established involving the respective user equipment, wherein the telecommunications network is configured such that:

both the first type of data transmission service and the second type of data transmission service require, respectively, a first communication bearer to be established between the telecommunications network and the respective user equipment of the plurality of user equipments, at least a second communication bearer is established and/or activated by or for the first user equipment in case that the first user equipment detects a network performance of the telecommunications network above a predefined first network performance threshold or receives an information indicating such a network performance above the predefined first network performance threshold.

Thereby, it is advantageously possible to provide a telecommunications network that provides advantages of methods and systems according to various embodiments of the present invention.

Additionally, the present invention relates to a program comprising a computer readable program code which, when executed on a computer or on a network node of a telecommunications network or on a first user equipment, or in part on the computer and in part on the network node of the telecommunications network and/or in part on the first user equipment, causes the computer or the network node of the telecommunications network or the first user equipment to perform exemplary embodiments of the inventive method.

Still additionally, an exemplary embodiment of the present invention provides a computer program product for providing communication services to a plurality of user equipments of a telecommunications network, the computer program product comprising a computer program stored on a storage medium, the computer program comprising program code which, when executed on a computer or on a network node of a telecommunications network or on a first user equipment, or in part on the computer and in part on the network node of the telecommunications network and/or in part on the first user equipment, causes the computer or the network node of the telecommunications network or the first user equipment to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
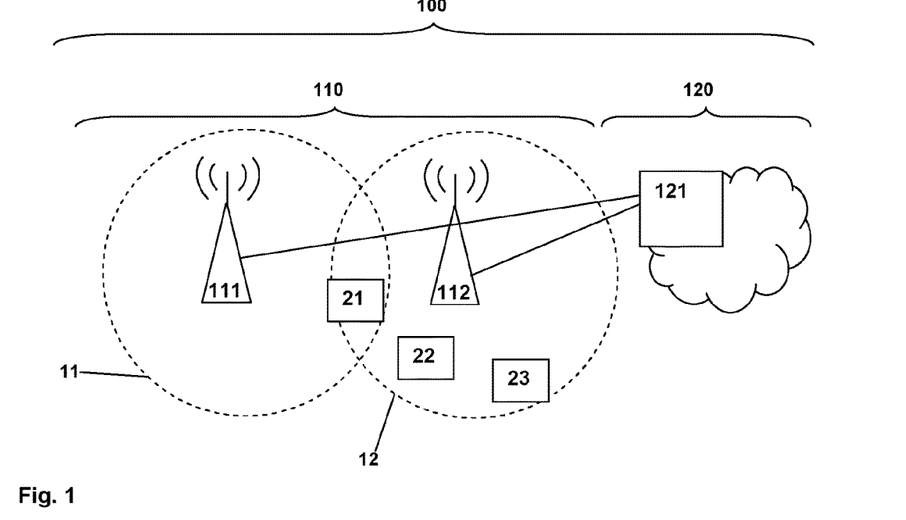
FIG. 1 schematically illustrates a mobile communication network comprising a multitude of radio cells being served by a multitude of base station entities, and a plurality of user equipments being served by the mobile communication network, wherein the mobile communication network serves as an example of a telecommunications network according to the present invention.

In FIG. 1, a mobile communication network as an example of a telecommunications network 100 is schematically shown. In the example, the mobile communication network comprises an access network 110 and a core network 120. The mobile communication network is preferably a cellular telecommunications network comprising typically a plurality of network cells, wherein two radio cells are represented in FIG. 1 by means of reference signs 11 and 12: a first radio cell 11, and a second radio cell 12. The access network 110 comprises at least a first base station entity 111 serving the first radio cell 11, and a second base station entity 112, serving the second radio cell 12. A plurality of user equipments 21, 22, 23 are schematically depicted in FIG. 1 as examples of user equipments in contact with the telecommunications network 100. The user equipments comprise a first user equipment 21, a second user equipment 22, and a third user equipment 23. The user equipments 21, 22, 23 are connected to a gateway entity 121 of the telecommunications network 100. Typically, each one of user equipments 21, 22, 23 has at least a first communication bearer 31 established towards the telecommunications network 100 (i.e. towards the gateway entity 121). Instead of a mobile communication network, the telecommunications network 100 can also be realized as a fixed-line telecommunications network (not depicted in FIG. 1). A plurality of user equipments are connected to such a fixed-line telecommunications network in a manner analogous to the example depicted in FIG. 1 for the case of the mobile communication network as example for an exemplary embodiment of an inventive telecommunications network 100.

According to the present invention, a method, a system and a telecommunications network is proposed for providing communication services to a plurality of user equipments 21, 22, 23 of the telecommunications network 100, wherein the telecommunications network 100 is enabled to provide a first type of data transmission service or a second data transmission service. The first data transmission service is also referred to as a "premium service" whereas the second data transmission service is a "standard service". In the examples described herein, the first user equipment is an example for a user equipment receiving the first data transmission service, and the second user equipment 22 is an example for a user equipment receiving the second data transmission service.

The second data transmission service corresponds to a service that all the user equipments of the plurality of user equipments are able to receive. According to the present invention, the second data transmission service involves a predefined second maximum data transmission speed 61 (cf. FIG. 2). Additionally, but not necessarily, the second data transmission service can involve a predefined payload data transfer volume 51 per a predetermined time interval 41 which predefined payload data transfer volume 51 is available to be used by the respective user equipment at a higher data transmission speed up to the predefined second maximum data transmission speed 61 compared to a first maximum data transmission speed 62 to be applied once the predefined payload data transfer volume 51 is used prior to the end of the time interval.

Figure 2:
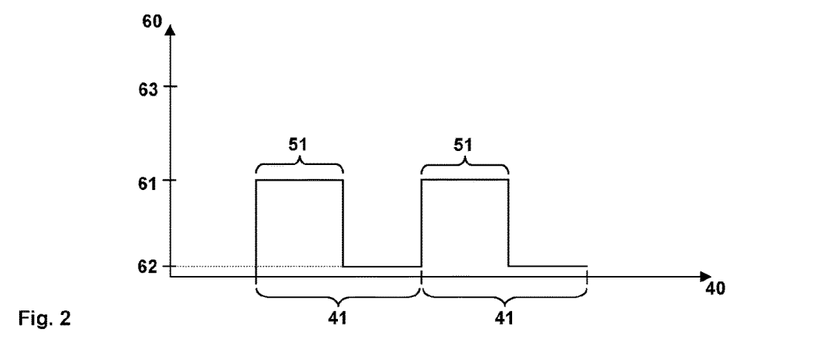
FIG. 2 schematically illustrates the situation of a user equipment being able to use a predefined payload data transfer volume per a predetermined time interval.

This is schematically represented in FIG. 2, where the situation of a user equipment (i.e. the second user equipment 22, which is, however, not specifically indicated in FIG. 2) being able to use a predefined payload data transfer volume per a predetermined time interval 41 is schematically shown. Once the predefined payload data transfer volume 51 is used prior to the end of the time interval 41 (e.g. an hour, several hours such as 2, 3, 4, 5, 6, 7, 8, 10, 12, 15, 18, or 24 hours, a day or several days such as 2, 3, 4, 5, 6, 7, 10, 14, or 21 days, a months or several months such as 2, 3, 4, 5, or 6 months), the available data transmission speed (being up to the predefined second maximum data transmission speed 61) is reduced to a first maximum data transmission speed 62.

According to the present invention, the first type of communication services involves providing a potentially unlimited payload volume of data transfer to be used by the respective user equipment (i.e. the first user equipment 21) during the predetermined time interval 41 such that the unlimited payload volume of data transfer is potentially available to be used by the respective user equipment at a data transmission speed (schematically indicated in FIG. 2 by means of reference sign 63) of up to at least the predefined second maximum data transmission speed 61 but perhaps even higher data transmission speeds.

Figure 3:
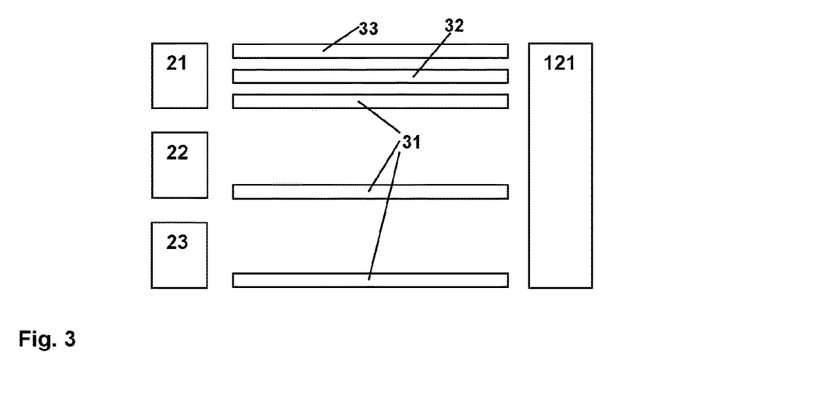
FIG. 3 schematically illustrates a plurality of user equipments being connected to a gateway entity of the telecommunications network according to the present invention.

According to an exemplary embodiment of the present invention, any data transmission of payload data between the telecommunications network 100 and any of the plurality of user equipments 21, 22, 23 requires at least one communication bearer being established involving the respective user equipment. An exemplary embodiment of the inventive method comprises the following steps:

in a first step, both the first type of communication services and the second type of communication services require, respectively, a first communication bearer 31 to be established between the telecommunications network 100 and the respective user equipment of the plurality of user equipments 21, 22, 23, in a second step, subsequent to the first step, at least a second communication bearer 32 is established and/or activated by or for the first user equipment 21 in case that the first user equipment 21 detects a network performance of the telecommunications network 100 above a predefined first network performance threshold or receives an information indicating such a network performance above the predefined first network performance threshold. Such a situation is schematically represented in FIG. 3. FIG. 3 shows a plurality of user equipments 21, 22, 23 being connected to the gateway entity 121 of the telecommunications network 100 according to the present invention. Each of these user equipments 21, 22, 23, respectively, have a first communication bearer 31 established towards the telecommunications network 100 (i.e. towards the gateway entity 121). The first user equipment 21 has—besides the first communication bearer 31—a second communication bearer 32 and also a third communication bearer 33 established towards the telecommunications network 100. Via the additional communication bearers 32, 33, it is possible to provide a data transmission bandwidth towards the first user equipment 21 which is increased compared to the data transmission bandwidth towards the second and third user equipment 22, 23 (this data transmission bandwidth corresponding at most to the second maximum data transmission speed 61).

Figure 4:
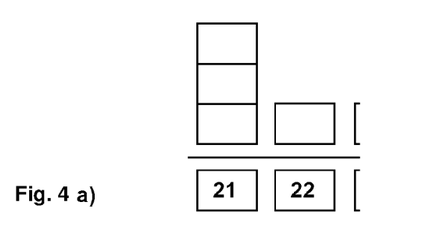
FIGS. 4a-4d schematically illustrate an exemplary embodiment of the inventive method according to the present invention, showing, for different situations, the bandwidths available to different user equipments connected to the telecommunications network.

In FIG. 4, an exemplary embodiment of the inventive method is schematically represented, showing, for different situations, the bandwidths (or data transmission speeds) available to different user equipments 21, 22, 23, 24, 25, 26 connected to the telecommunications network 100. Besides the first, second and third user equipment 21, 22, 23, also a fourth, fifth and sixth user equipment 24, 25, 26 are schematically represented in FIG. 4. FIG. 4a) assumes that the network load of the telecommunications network 100 is sufficiently small that the first user equipment 21 is connected to the telecommunications network 100 via three communication bearers (such as the first, second, and third communication bearer 31, 32, 33 depicted in FIG. 3), and the second and third user equipment 22, 23 are connected to the telecommunications network 100 via the first communication bearer. In the next step (cf. FIG. 4b)), it is assumed that a further user equipment (the fourth user equipment 24) requires data transport capacity from the telecommunications network 100 such that the network load of the telecommunications network 100 is insufficient to provide both the complete set of communication bearers previously (cf. FIG. 4a)) provided to the first user equipment 21, and additionally the data transport capacity for the fourth user equipment 24 (i.e. the first user equipment 21 detects a network performance of the telecommunications network 100 below the further second network performance threshold or receives an information indicating such a network performance below the further second network performance threshold, such an information (or message) being, e.g., sent to the first user equipment 21 by the core network 120 of the telecommunications network 100); therefore, the data transmission speed towards the first user equipment 21 is reduced and the data transmission towards the fourth user equipment 24 is established. In the next step (cf. FIG. 4c)), it is assumed that a further user equipment (the fifth user equipment 25) requires data transport capacity from the telecommunications network 100 such that the network load of the telecommunications network 100 is insufficient to provide both the set of communication bearers previously (cf. FIG. 4b)) provided to the first user equipment 21, and additionally the data transport capacity for the fifth user equipment 25 (i.e. the first user equipment 21 detects a network performance of the telecommunications network 100 below the second network performance threshold or receives an information indicating such a network performance below the second network performance threshold, such an information (or message) being, e.g., sent to the first user equipment 21 by the core network 120 of the telecommunications network 100); therefore, the data transmission speed towards the first user equipment 21 is reduced and the data transmission towards the fifth user equipment 25 is established. In the next step (cf. FIG. 4d)), it is assumed that a further user equipment (the sixth user equipment 26) requires data transport capacity from the telecommunications network 100 such that the network load of the telecommunications network 100 is insufficient to serve all the user equipments 21, 22, 23, 24, 25 with the standard data transmission bandwidth, and additionally the data transport capacity for the sixth user equipment 26; therefore, the data transmission speed towards the first, second, third, fourth, and fifth user equipment 21, 22, 23, 24, 25 is reduced and the data transmission towards the fifth user equipment 25 is established.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing communication services to a plurality of user equipments of a telecommunications network,
   wherein the telecommunications network provides a first type of data transmission service to a first user equipment of the plurality of user equipments using a first communication bearer established between the telecommunications network and the first user equipment,
   wherein the telecommunications network provides a second type of data transmission service to a second user equipment of the plurality of user equipments using a first communication bearer established between the telecommunications network and the second user equipment,
   wherein the second type of data transmission service is limited by:
      a predefined maximum data transmission speed, and/or
      a predefined payload data transfer volume for a predetermined time interval, wherein up to the predefined payload data transfer volume for the predetermined time interval, the second type of data transmission service is limited by the predefined maximum data transmission speed, and after the predefined payload data transfer volume for the predetermined interval is exceeded, the second type of data transmission service is limited by a reduced maximum data transmission speed until an end of the predetermined time interval,
   wherein the first type of data transmission service is not subject to the data transmission speed limit of the second type of data transmission service and/or not subject to the payload data transfer volume limit of the second type of data transmission service,
   wherein the method comprises:
   establishing and/or activating a second communication bearer between the telecommunications network and the first user equipment in response to the first user equipment detecting network performance of the telecommunications network above a predefined first network performance threshold or receiving information indicating network performance above the predefined first network performance threshold;
   wherein network performance being above the predefined first network performance threshold corresponds to the telecommunications network having sufficient spare capacity to provide the first user equipment with enhanced data transmission speed by providing the second communication bearer between the telecommunications network and the first user equipment.

2. The method according to claim 1, wherein a first quality-of-service level corresponds to the first communication bearers between the telecommunications network and the first user equipment and between the telecommunications network and the second user equipment, wherein a second quality-of-service level corresponds to the second communication bearer between the telecommunications network and the first user equipment, and wherein the second quality-of-service level is inferior to the first quality-of-service level.

3. The method according to claim 1, further comprising:
   after establishing and/or activating the second communication bearer between the telecommunications network and the first user equipment, establishing and/or activating a third communication bearer between the telecommunications network and the first user equipment in response to the first user equipment detecting network performance of the telecommunications network above a predefined further first network performance threshold or receiving information indicating network performance of the telecommunications network is above the predefined further first network performance threshold;
    wherein network performance being above the predefined further first network performance threshold corresponds to the telecommunications network having sufficient spare capacity to provide the first user equipment with further enhanced data transmission speed by providing the third communication bearer between the telecommunications network and the first user equipment.

4. The method according to claim 3, wherein the predefined further first network performance threshold corresponds to the predefined first network performance threshold or exceeds the predefined first network performance threshold.

5. The method according to claim 3, wherein a first quality-of-service level corresponds to the first communication bearers between the telecommunications network and the first user equipment and between the telecommunications network and the second user equipment, wherein a second quality-of-service level corresponds to the second communication bearer between the telecommunications network and the first user equipment, wherein the second quality-of-service level is inferior to the first quality-of-service level, wherein a third quality-of-service level corresponds to the third communication bearer between the telecommunications network and the first user equipment, and wherein the third quality-of-service level is inferior to the second quality-of-service level.

6. The method according to claim 3, wherein network performance of the telecommunications network is above the predefined first network performance threshold and/or above the predefined further first network performance threshold is detected or indicated by an information in case that one or more of the following situations apply:
    a time of the day corresponds to a specific time interval during a day;
    a packet latency of data packets is detected to be below a predetermined latency threshold and/or below a further predetermined latency threshold;
    a roundtrip time of data packets is detected to be below a predetermined roundtrip time threshold and/or below a further predetermined roundtrip time threshold;
    a packet loss rate of data packets is detected to be below a predetermined packet loss rate threshold and/or below a further predetermined packet loss rate threshold; or
    a maximum throughput is detected to be above a predetermined throughput threshold and/or above a further predetermined throughput threshold.

7. The method according to claim 3, wherein the first, second and/or third communication bearers and/or the third communication bearer between the telecommunications network and the first user equipment are established and/or activated between a gateway entity of the telecommunications network and the first user equipment, and/or
    wherein the first communication bearer between the telecommunications network and the second user equipment is established and/or activated between the gateway entity of the telecommunications network and the second user equipment.

8. The method according to claim 3, wherein the second communication bearer and/or the third communication bearer between the telecommunications network and the first user equipment are continuously established for the first user equipment but only activated in case that corresponding network conditions of the telecommunications network apply.

9. The method according to claim 3, wherein
    the first communication bearer between the telecommunications network and the first user equipment and the second communication bearer between the telecommunications network and the first user equipment are aggregated;
    the second communication bearer between the telecommunications network and the first user equipment and the third communication bearer between the telecommunications network and the first user equipment are aggregated; and/or
    the first communication bearer between the telecommunications network and the first user equipment, the second communication bearer between the telecommunications network and the first user equipment, and the third communication bearer between the telecommunications network and the first user equipment are aggregated.

10. The method according to claim 3, further comprising:
    after establishing and/or activating the second communication bearer between the telecommunications network and the first user equipment, removing and/or de-activating the second communication bearer between the telecommunications network and the first user equipment in response to the first user equipment detecting network performance of the telecommunications network below a predefined second network performance threshold or receiving information indicating network performance below the predefined second network performance threshold; and/or
    after establishing and/or activating the second communication bearer between the telecommunications network and the first user equipment, removing and/or de-activating the third communication bearer between the telecommunications network and the first user equipment in response to the first user equipment detecting network performance of the telecommunications network below a predefined further second network performance threshold or receiving information indicating network performance below the predefined further second network performance threshold.

11. A system for providing communication services to a plurality of user equipments of a telecommunications network, the system comprising:
    the telecommunications network; and
    a first user equipment;
    wherein the telecommunications network is configured to provide a first type of data transmission service to the first user equipment using a first communication bearer established between the telecommunications network and the first user equipment,
    wherein the telecommunications network is configured to provide a second type of data transmission service to a second user equipment using a first communication bearer established between the telecommunications network and the second user equipment,
    wherein the second type of data transmission service is limited by:
        a predefined maximum data transmission speed, and/or a predefined payload data transfer volume for a predetermined time interval, wherein up to the predefined payload data transfer volume for the predetermined time interval, the second type of data transmission service is limited by the predefined maximum data transmission speed, and after the predefined payload data transfer volume for the predetermined interval is exceeded, the second type of data transmission service is limited by a reduced maximum data transmission speed until an end of the predetermined time interval, wherein the first type of data transmission service is not subject to the data transmission speed limit of the second type of data transmission service and/or not subject to the payload data transfer volume limit of the second type of data transmission service;

wherein the telecommunications network is configured to establish and/or activate a second communication bearer between the telecommunications network and the first user equipment in response to the first user equipment detecting network performance of the telecommunications network above a predefined first network performance threshold or receiving information indicating network performance above the predefined first network performance threshold;

wherein network performance being above the predefined first network performance threshold corresponds to the telecommunications network having sufficient spare capacity to provide the first user equipment with enhanced data transmission speed by providing the second communication bearer between the telecommunications network and the first user equipment.

12. A non-transitory computer-readable medium having processor-executable instructions stored thereon for providing communication services to a plurality of user equipments of a telecommunications network, wherein the telecommunications network provides a first type of data transmission service to a first user equipment of the plurality of user equipments using a first communication bearer established between the telecommunications network and the first user equipment, wherein the telecommunications network provides a second type of data transmission service to a second user equipment of the plurality of user equipments using a first communication bearer established between the telecommunications network and the second user equipment, wherein the second type of data transmission service is limited by:
a predefined maximum data transmission speed, and/or
a predefined payload data transfer volume for a predetermined time interval, wherein up to the predefined payload data transfer volume for the predetermined time interval, the second type of data transmission service is limited by the predefined maximum data transmission speed, and after the predefined payload data transfer volume for the predetermined interval is exceeded, the second type of data transmission service is limited by a reduced maximum data transmission speed until an end of the predetermined time interval, wherein the first type of data transmission service is not subject to the data transmission speed limit of the second type of data transmission service and/or not subject to the payload data transfer volume limit of the second type of data transmission service;

wherein the processor-executable instructions, when executed, facilitate:

establishing and/or activating a second communication bearer between the telecommunications network and the first user equipment in response to the first user equipment detecting network performance of the telecommunications network above a predefined first network performance threshold or receiving information indicating network performance above the predefined first network performance threshold;

wherein network performance being above the predefined first network performance threshold corresponds to the telecommunications network having sufficient spare capacity to provide the first user equipment with enhanced data transmission speed by providing the second communication bearer between the telecommunications network and the first user equipment.

* * * * *